(12) United States Patent
Sato et al.

(10) Patent No.: US 6,884,406 B2
(45) Date of Patent: Apr. 26, 2005

(54) PROCESS FOR PREPARING AN ALUMINA COMPOSITION

(76) Inventors: Goro Sato, 2530, Oaza-Tonda, Wakamatsu-ku, Kitakyushu-shi, Fukuoka 808-0112 (JP); Masayoshi Sato, 2530, Oaza-Tonda, Wakamatsu-ku, Kitakyushu-shi, Fukuoka 808-0112 (JP)

( * ) Notice: Subject to any disclaimer, the term of this patent is extended or adjusted under 35 U.S.C. 154(b) by 92 days.

(21) Appl. No.: 09/958,055

(22) PCT Filed: May 2, 2001

(86) PCT No.: PCT/JP01/00786

§ 371 (c)(1),
(2), (4) Date: Oct. 3, 2001

(87) PCT Pub. No.: WO01/56951

PCT Pub. Date: Aug. 9, 2001

(65) Prior Publication Data

US 2003/0044348 A1 Mar. 6, 2003

(30) Foreign Application Priority Data

Feb. 4, 2000 (JP) ..................... pct/jp00/00620

(51) Int. Cl.[7] .................... C01F 7/00; B01J 21/04
(52) U.S. Cl. ................ 423/626; 423/628; 502/355; 502/439
(58) Field of Search ............... 423/626, 628; 502/355, 439; 516/93

(56) References Cited

U.S. PATENT DOCUMENTS

| | | | |
|---|---|---|---|
| 2,915,475 A | 12/1959 | Bugosh | |
| 4,344,928 A | 8/1982 | Dupin et al. | |
| 4,983,435 A | 1/1991 | Ueki et al. | |
| 5,286,776 A | 2/1994 | Ichikawa et al. | |
| 6,171,573 B1 | 1/2001 | Sato | |

FOREIGN PATENT DOCUMENTS

| | | |
|---|---|---|
| EP | 0 394 500 A1 | 10/1990 |
| EP | 0 459 357 A2 | 12/1991 |
| EP | 0 885 844 A1 | 12/1998 |
| JP | (1971) 46-7164 | 12/1971 |
| JP | (1985) 60-166220 A | 8/1985 |
| JP | (1986) 61-26512 B2 | 2/1986 |
| JP | (1993) 05-024824 A | 2/1993 |
| JP | (1995) 07-010535 A | 1/1995 |
| WO | WO 95/20487 A1 | 8/1995 |
| WO | WO 97/32817 A1 | 12/1998 |
| WO | WO 99/66002 A2 | 12/1999 |

OTHER PUBLICATIONS

Patent Abstract of Japan, JP 7267633 A, (Kyocera Corp.), Oct. 17, 1995.

Patent Abtract of Japan, JP 7256100 A (Agency of Industrial Science & Technology), Oct. 9, 1995.

Patent Abstract of Japan, JP 6293577 A (Tsusho Sangyosho Kisosangyo Kyokucho), Oct. 21, 1994.

Patent Abstract of Japan, JP 5043344 A (Colloid Res KK), Feb. 23, 1993.

*Primary Examiner*—Steven Bos
(74) *Attorney, Agent, or Firm*—Webb Ziesenheim Logsdon Orkin & Hanson, P.C.

(57) ABSTRACT

Disclosed is a process for preparing an alumina composition having high specific surface area and large pore volume, comprising preparing a reaction mixture having a given molar ratio between a monobasic acid and water by the use of an aluminum source such as acid-containing alumina obtained by heat treatment of aluminum hydroxide in the presence of an acid, bayerite, ρ-alumina and γ-alumina, optionally adding an oxygen-containing organic compound or an inorganic polybasic acid as a pore structure controlling agent, performing sol-forming reaction, and then subjecting the product obtained by the sol-forming reaction to an appropriate operation such as alkali addition or heat dehydration treatment. Also disclosed are a catalyst for petroleum refining, a carrier of monolithic type obtained by monolithic molding, and a molded carrier having a porous structure having pore size of submicron to several tens micron particless, all of which take advantage of properties of fibrous boehmite produced by the above process.

3 Claims, 2 Drawing Sheets

PROCESS FOR PREPARING AN ALUMINA COMPOSITION

BACKGROUND OF THE INVENTION

1. Field of the Invention

The present invention relates to a process for preparing an alumina composition and an alumina composition obtained by the process. More particularly, the invention relates to a carrier for a petroleum refining catalyst, an alumina composition suitable for a catalyst, a process for preparing the alumina composition, an alumina composition suitable for a monolithic molded product used for an exhaust gas purifying catalyst or an absorbent, a process for preparing the alumina composition, and a catalyst or a monolithic molded product formed from the alumina composition.

2. Background Art

It has been heretofore known to use, as an aluminum source to prepare an aqueous alumina sol, a gel obtained by hydrolysis of an aluminum salt (U.S. Pat. No. 2,915,475), metallic aluminum (Japanese Patent Publication No. 166220/1985, Japanese Patent Laid-Open Publication No. 24824/1993) or an aluminum alkoxide (Japanese Patent Publication No. 166220/1985, Japanese Patent Laid-Open Publication No. 10535/1995).

An alumina carrier for a hydrotreating catalyst used for petroleum refining is desired to be controlled in its specific surface area, pore volume and pore size distribution, and as the alumina carrier, alumina obtained from pseudoboehmite prepared by hydrolysis of an aluminum salt in an aluminum salt aqueous solution has been heretofore employed (see Japanese Patent Laid-Open Publication No. 71456/1971 and Japanese Patent Publication No. 26512/1986). In the above methods, however, there is a problem in that a large amount of energy is consumed and wastes are produced.

The present inventor has proposed before an alumina sol and a process for preparing the same (WO97/32817). By the use of this alumina sol, alumina of high specific surface area can be obtained, but it is difficult to obtain alumina of much higher specific surface area. In addition, an inexpensive aluminum source such as gibbsite cannot be used alone. On the other hand, a monolithic type catalyst carrier, that is used for a catalyst for purifying exhaust gas from a mobile generation source, needs a complicated preparation process comprising molding inert cordierite or stainless steel into a monolithic substrate and then coating the surface of the substrate with a carrier material mainly containing alumina by wash coating.

SUMMARY OF THE INVENTION

The process for preparing an alumina composition according to the invention comprises adding water and optionally a monobasic acid or its salt to at least one aluminum hydroxide and/or alumina selected from the following substances (A) to (D):

(A) acid-containing aluminum hydroxide obtained by heating aluminum hydroxide in the presence of a monobasic acid or its salt, (B) acid-containing alumina obtained by treating activated alumina in the presence of a monobasic acid or its salt, (C) bayerite, and (D) γ-alumina, to prepare a reaction mixture having a k value adjusted to be in the following range, said k value being represented by the following formula (1):

$$0.0001 \leq k \leq 0.20$$

$$k = (b/a) \times (b/c) \quad (1)$$

wherein a is a number of moles of alumina in the reaction mixture in terms of $Al_2O_3$, b is a number of moles of acid or its salt, and c is a number of moles of water, then subjecting the reaction mixture to sol-forming reaction through hydrothermal synthesis, wet grinding or the like at a temperature of not higher than 250° C. to obtain an alumina sol and/or an alumina gel, and subjecting the alumina sol and/or the alumina gel to neutralization, hydrothermal treatment, drying, calcining and the like.

In the above process, to the reaction mixture may be optionally added a pore structure controlling agent selected from an oxygen-containing organic compound and an inorganic polybasic acid.

The process of the invention, in another embodiment, comprises adding water, a monobasic acid or its salt and a pore structure controlling agent selected from an acid-containing organic compound and an inorganic polybasic acid to alumina having a ρ-crystal structure to prepare a reaction mixture having a k value adjusted to be in the range of $0.0001 \leq k \leq 0.20$, said k value being represented by the above formula, then subjecting the reaction mixture to sol-forming reaction through hydrothermal synthesis, wet grinding or the like at a temperature of not higher than 250° C. to obtain an alumina sol and/or an alumina gel, and subjecting the alumina sol and/or the alumina gel to neutralization, hydrothermal treatment, drying, calcining and the like.

The process of the invention, in a further embodiment, comprises adding water and an inorganic monobasic acid or its salt to alumina having a ρ-crystal structure to prepare a reaction mixture having a k value adjusted to be in the range of $0.01 \leq k \leq 0.20$, said k value being represented by the above formula, then subjecting the reaction mixture to sol-forming reaction through hydrothermal synthesis, wet grinding or the like at a temperature of not higher than 250° C. to obtain an alumina sol and/or an alumina gel, and subjecting the alumina sol and/or the alumina gel to drying and calcining.

The molded product according to the invention is obtained by molding a mixture of an alumina sol and/or an alumina gel and a functional compound in an amount of 0 to 95% by weight in terms of the solid matter, said alumina sol and/or alumina gel being obtained by the use of a zirconium compound as the inorganic polybasic acid.

The porous structure according to the invention is obtained by molding a mixture of the alumina sol and/or the alumina gel and organic microcapsules and then calcining the molded product.

The catalyst according to the invention comprises a carrier made of the alumina composition obtained by the above process and a catalyst component supported on the carrier.

DETAILED DESCRIPTION OF THE INVENTION

Figure 1:
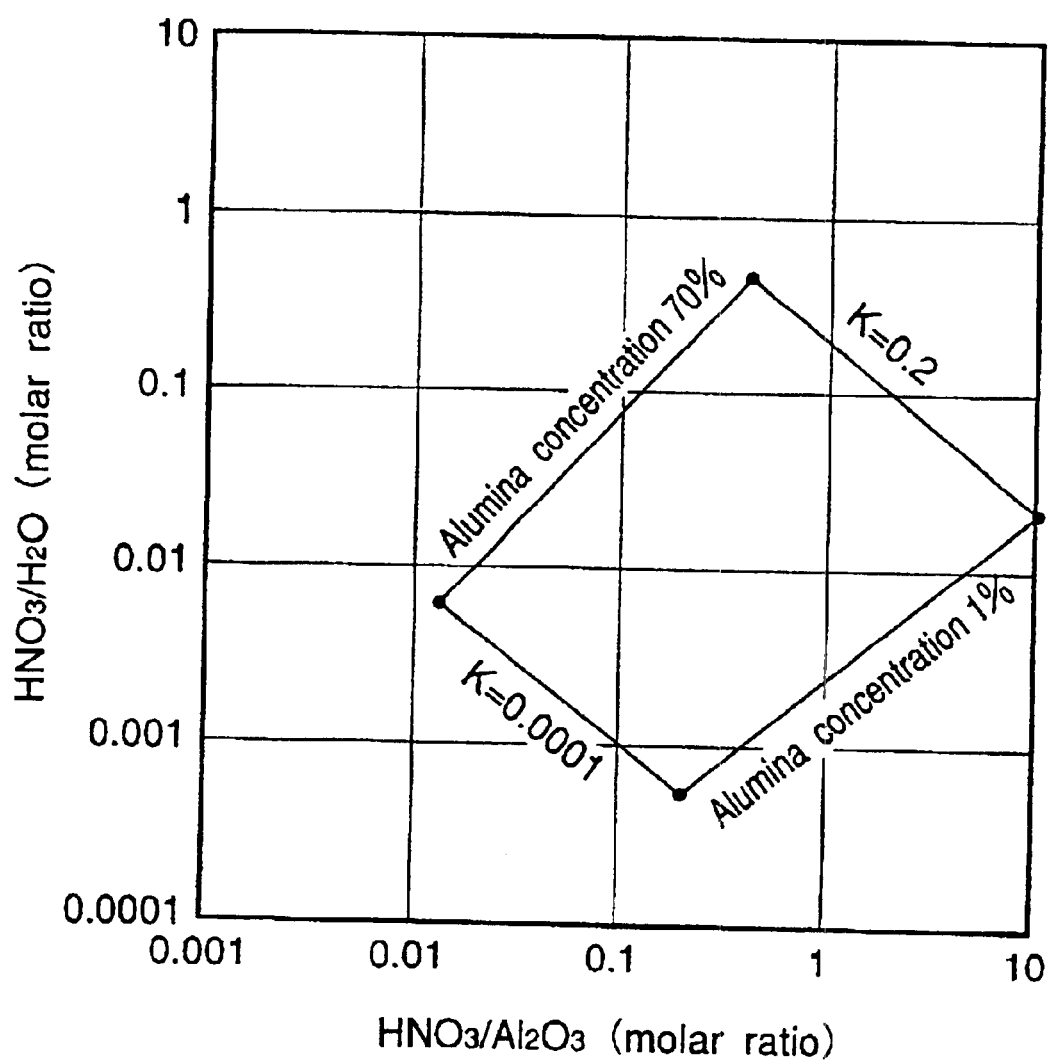
FIG. 1 shows component ratios of a reaction mixture using nitric acid as the monobasic acid and having an alumina concentration of 1 to 70% by weight and a k value of 0.0001 to 0.20.

The present invention is constituted of the following three matters:

(1) a matter related to an optimum material used as an aluminum source in the preparation of the alumina composition, a k value as a preparation condition, addition of a pore controlling agent, and other conditions, (2) a matter related to plasticity of the alumina composition and uses of the composition taking advantage of its mechanical strength, and (3) a matter related to a hydrotreating catalyst for the petroleum refining.

In this specification, the symbol "%" means "% by weight" unless otherwise noted.

Process for Preparing Alumina Composition (1) Aluminum Source

The aluminum sources employable in the invention are preferably (A) acid-containing aluminum hydroxide (sometimes referred to as "acid-treated aluminumhydroxide" hereinafter) obtained by heating specific aluminum hydroxide in the presence of a monobasic acid or its salt, (B) acid-containing alumina (sometimes referred to as "acid-treated alumina" hereinafter) obtained by treating specific activated alumina in the presence of a monobasic acid or its salt, (C) bayerite, and (D) specific γ-alumina or ρ-alumina.

The aluminum sources are described below in detail.

As the aluminum hydroxide for the acid-containing aluminum hydroxide (A), gibbsite or bayerite is used, and gibbsite or bayerite is heated at a temperature of 150 to 350° C. in the presence of a monobasic acid or its salt. The heating is carried out in a closed vessel to prevent evaporation of acid, but if a monobasic acid salt having low vapor pressure is present, the heating may be carried out in an open system.

As the specific activated alumina used for the acid-containing alumina, γ-alumina or ρ-alumina having a specific surface area of about 150 to 250 m$^2$/g is effective, though such a lumina could not be used in the conventional process as an aluminum source. The alumina is heated at a temperature of 0 to 350° C. in the presence of a monobasic acid or a monobasic acid salt. Acid treatment of ρ-alumina at 0° C. contributes to increase in the specific surface area of the resulting alumina.

The monobasic acid used for the acid treatment is, for example, nitric acid, acetic acid or a salt of a monobasic acid, such as aluminum nitrate, and the amount thereof is in the range of usually 0.05 to 1.0 mol, preferably 0.1 to 0.5 mol, based on 1 mol of Al$_2$O$_3$.

The bayerite (C) is equal to the bayerite used in the acid treatment for preparing the acid-containing aluminum hydroxide (A) In the present invention, bayerite having been subjected to no acid treatment can also be used as it is as the aluminum source.

The specific γ-alumina (D) is γ-alumina having a specific surface area of not less than 250 m$^2$/g, and the ρ-alumina is alumina having a ρ-crystal structure, that is described in WO97/32817. Similarly to the bayerite, they can be used as they are as aluminum sources without being subjected to acid treatment.

In the present invention, it is possible to use a mixture of two or more of the substances (A) to (D) as the aluminum source.

As the specific activated alumina used for the acid-containing alumina, γ-alumina or ρ-alumina having a specific surface area of about 150 to 250 m$^2$/g is effective, though such alumina could not be used in the conventional process as an aluminum source. The alumina is heated at a temperature of 0 to 350° C. in the presence of a monobasic acid or a monobasic acid salt. Acid treatment of ρ-alumina at 0° C. contributes to increase in the specific surface area of the resulting alumina.

The monobasic acid used for the acid treatment is, for example, nitric acid, acetic acid or a salt of a monobasic acid, such as aluminum nitrate, and the amount thereof is in the range of usually 0.05 to 1.0 mol, preferably 0.1 to 0.5 mol, based on 1 mol of Al$_2$O$_3$.

The bayerite (C) is equal to the bayerite used in the acid treatment for preparing the acid-containing aluminum hydroxide (A) In the present invention, bayerite having been subjected to no acid treatment can also be used as it is as the aluminum source.

The specific γ-alumina (D) is γ-alumina having a specific surface area of not less than 250 m$^2$/g, and the ρ-alumina is alumina having a 92-crystal structure, that is described in WO97/32817. Similarly to the bayerite, they can be used as they are as aluminum sources without being subjected to acid treatment.

In the present invention, it is possible to use a mixture of two or more of the substances (A) to (D) as the aluminum source.

(2) Reaction Mixture of Standard Composition

First, composition of a reaction mixture (sometimes referred to as a "standard reaction mixture" hereinafter) for obtaining an acid aqueous alumina sol and/or an acid aqueous alumina gel is described.

The acid aqueous alumina sol and/or the acid aqueous alumina gel referred to herein is any one of an aqueous sol in which fibrous boehmite obtained by the hydrothermal treatment is dispersed, an aqueous gel in which the fibrous boehmite forms a three-dimensional network structure and a mixture of the sol and the gel. In the present invention, the acid aqueous alumina sol and/or the acid aqueous alumina gel is sometimes referred to as an "aqueous alumina sol gel" or an "aqueous sol gel".

In the present invention, the aluminum source, water and a monobasic acid or its salt are mixed in a given ratio by mol to prepare a reaction mixture. The reaction mixture is allowed to undergo sol-forming reaction under given conditions to obtain an acid aqueous alumina sol and/or an acid aqueous alumina gel comprising fibrous boehmite particles.

The molar ratio between the alumina, the acid and water in the reaction mixture is indicated by a k value defined by the following formula (1), and a reaction mixture having a k value in a fixed range is prepared.

$$k=(b/a)\times(b/c) \qquad (1)$$

In the above formula, a is a number of moles of alumina in the reaction mixture in terms of Al$_2$O$_3$, b is a number of moles of the monobasic acid or its salt, and c is a number of moles of water.

In the present invention, the k value is preferably in the following range.

$$0.0001 \leq k \leq 0.20$$

When nitric acid is used as the monobasic acid and the alumina concentration is in the range of 1 to 70% by weight, the above relation is graphically illustrated in FIG. 1.

When the amounts of alumina, water and the acid are controlled so that the k value is in the above range, an acid aqueous alumina sol comprising particulate fibrous boehmite of high monodispersibility is obtained. From the alumina sol, an alumina composition having high specific surface area and large pore volume can be obtained, and from such an alumina composition, a molded product having high mechanical strength can be obtained.

When the k value is less than 0.000, the resulting boehmite comprises non-fibrous large particles. When the k value exceeds 0.20, fibrous boehmite is obtainable, but the boehmite is liable to agglomerate and contains a large amount of a non-boehmite component. In each case, the resulting alumina composition has small pore volume and is difficult to mold, and besides, the mechanical strength of a molded product of the composition is low.

Examples of the monobasic acids employable in the invention include inorganic monobasic acids, such as nitric acid and hydrochloric acid; lower aliphatic monocarboxylic acids, such as formic acid, acetic acid and propionic acid; and salts of monobasic acids containing these acid radicals, such as aluminum nitrate, basic aluminum acetate and ammonium acetate. These monobasic acids and salts are used singly or in combination.

When the acid used is an inorganic monobasic acid or its salt, the k value is more preferably in the range of 0.0001 to 0.05. When the k value exceeds 0.05, an aqueous sol gel having no transparency is formed. However, if the aqueous sol is improved in shearing stress in the subsequent kneading step, an effective alumina composition can be obtained. When the acid used is a lower aliphatic monocarboxylic acid, the k value is more preferably in the range of 0.002 to 0.20. If the k value is less than 0.002, an opaque acid aqueous sol gel is formed. However, by the addition of the later-described pore structure controlling agent, an effective alumina composition can be obtained.

The alumina concentration in the reaction mixture is preferably in the range of 1 to 70% by weight in terms of $Al_2O_3$. When the alumina concentration is less than 1% by weight, the proportion of a water-soluble component becomes large, resulting in a problem of low alumina yield. When the alumina concentration is in the range of 60 to 70% by weight, a powdery product is obtained. However, addition of water and aqueous ammonia after the sol-forming reaction and intensive kneading make the molding operation possible, and in this case, an alumina composition having specific surface area higher than that of an alumina composition obtained when the alumina concentration is lower than 60% by weight is obtained. When the alumina concentration exceeds 70% by weight, the resulting hydrated alumina has no plasticity, and the molding operation becomes difficult.

To the reaction mixture, alumina having higher solubility than crystalline boehmite may be added in an amount of not more than 95% by weight in terms of $Al_2O_3$, based on the aluminum source. Examples of such alumina include gibbsite, pseudoboehmite, non-crystalline hydrated alumina, χ-alumina, γ-alumina and η-alumina.

In the present invention, to the reaction mixture of the aforesaid standard composition for forming an aqueous alumina sol, a pore structure controlling agent may be added in order to improve properties such as specific surface area. By the addition of the pore structure controlling agent, a part of fibrous boehmite particles are crosslinked to form a gel, and hence a mixture of an aqueous alumina sol and an aqueous alumina gel is obtained as the sol-forming reaction product.

The pore structure controlling agent is an oxygen-containing organic compound, an inorganic polybasic acid, or a compound which is dissolved in water to produce an inorganic polybasic acid.

Examples of the oxygen-containing organic compounds include carbohydrates, such as starch, agar—agar, gelatin, mannan and CMC, monohydric or polyhydric alcohols, ketones, esters, higher aliphatic monocarboxylic acids, aromatic monocarboxylic acids, oxycarboxylic acids and oxypolycarboxylic acids. These oxygen-containing organic compounds may be compounds containing sodium, ammonium, aluminum or the like.

When a monohydric alcohol, a ketone or an ester is added as the oxygen-containing organic compound, the product obtained is an aqueous alumina sol, and in this case, the effect of increasing pore volume of an alumina composition obtained from the sol is high though the effect of increasing specific surface area thereof is low. In the use of a higher aliphatic monocarboxylic acid, the specific surface area and the pore volume are increased. In the use of an oxypolycarboxylic acid, a hard aqueous alumina gel is formed, and this alumina gel increases specific surface area of the alumina composition but decreases pore volume thereof. In the use of an oxymonocarboxylicacid, a polyhydricalcohol, a polycarboxylic acid or a carbohydrate, an effect of increasing specific surface area and pore volume of the alumina composition is observed, and some of these compounds contribute to making the pore size distribution sharp.

Most of the above oxygen-containing organic compounds contribute to improving mechanical strength of alumina molded products.

It is preferable to use the oxygen-containing organic compound in an amount of 0.0002 to 0.2 part by weight, based on 1 part by weight of the alumina material in terms of alumina. If the amount thereof exceeds 0.2 part by weight, the pore volume of macropores in the resulting alumina composition is increased, and hence mechanical strength of a molded product formed from the composition may be lowered.

The oxygen-containing organic compound is thought to participate in the formation of primary particle of boehmite and crosslinking reaction of the fibrous crystalline boehmite particles.

When no pore structure controlling agent is added, the resulting alumina composition has, after calcined at 550° C., a specific surface area ranging from 100 to 250 $m^2/g$ and a pore volume of pores having pore diameter of less than 60 nm ranging from 0.5 to 1.0 ml/g. On the other hand, when the oxygen-containing organic compound is added, the resulting alumina composition has, after calcined at 550° C., a specific surface area ranging from 200 to 300 $m^2/g$ and a pore volume of pores having pore diameter of less than 60 nm ranging from 0.5 to 1.2 ml/g. That is, by the addition of the oxygen-containing organic compound, the specific surface area is greatly improved as compared with the case where no oxygen-containing organic compound is used.

The effect due to the addition of the oxygen-containing organic compound is observed not only when the aluminum source for the present invention is used but also when other aluminum sources for the conventional alumina sol formation are used with adopting the composition of the reaction mixture of the invention and the sol-forming reaction conditions of the invention. That is, the effect of increasing specific surface area of the resulting alumina is observed.

Another example of the pore structure controlling agent that is effective for the increase of specific surface area of alumina is an inorganic polybasic acid. The inorganic polybasic acid is a polybasic acid containing an element having an ionic potential of not less than 4.5, such as B, C, Si, P, S, Ti, V, Zr, Mo or W, or a compound capable of forming a polybasic acid. Useful examples of such acids include boric acid, carbonic acid, silicic acid (dealkalization of sodium silicate with cation-exchange resin), polysilicic acid (hydrolyzate of ethyl silicate), phosphoric acid, sulfuric acid, sulfosalicylic acid, ammonium sulfate, peroxotitanic acid, vanadic anhydride, zirconyl acetate, molybdic acid, molybdenum trioxide and tungstic acid.

The ionic potential is defined by the following formula.

Ionic potential=(Valence/Radius of ion)

In case of a polybasic acid containing a light element such as B, Si or P, an alumina composition having a specific surface area of 200 to 400 $m^2/g$ can be obtained even by the addition in a small amount, and besides the pore volume is likely to be increased. In case of a polybasic acid containing a heavy element such as Mo or W, increase in the specific surface area of the resulting alumina composition is not observed by the addition in a small amount. However, if the polybasic acid is added in such an amount that the content of the polybasic acid in the alumina becomes almost equal to the content of $MoO_3$ and $WO_3$ in the Mo—W catalyst for a petroleum refining catalyst, namely, 10 to 30% by weight, an alumina composition having a specific surface area of 200 to 400 $m^2/g$ can be obtained.

From the above results, the polybasic acid is desirably added in such an amount that the atomic ratio of the polybasic acid to 1 mol of Al atom of the alumina in the reaction mixture is in the range of 0.002 to 0.2.

As the inorganic polybasic acid for use in the invention, the above compound may be used as it is, or a compound capable of undergoing dissociation or decomposition in hot water to form the above polybasic compound may be used.

The sol-forming reaction product obtained by the addition of the inorganic polybasic acid is nearly a white opaque gel rather than a sol, but when a Zr component is added, an aqueous alumina sol is obtained. When the amount of the inorganic polybasic acid is small, fibrous crystalline boehmite is likely to be formed. On the other hand, when the amount thereof becomes large, crystallinity of the boehmite tends to be lowered.

In the present invention, the inorganic polybasic acid and the oxygen-containing organic compound may be used in combination, and the combination use contributes to increase in the specific surface area of the resulting alumina composition.

The effect due to the addition of the inorganic polybasic acid is observed not only when the aluminum source for the present invention is used but also when other aluminum sources for the conventional alumina sol formation are used with adopting the composition of the reaction mixture of the invention and the hydrothermal synthesis conditions of the invention. That is, the effect of increasing specific surface area of the resulting alumina is observed.

(3) Sol-forming Reaction

In the present invention, the reaction mixture prepared as above is then subjected to sol-forming reaction at a temperature of not higher than 250° C., preferably 0 to 250° C., more preferably 50 to 220° C. When the temperature for the sol-forming reaction is not lower than the boiling point of the reaction mixture, the sol-forming reaction is carried out in a pressure vessel such as an autoclave, and in this case, the sol-forming reaction is carried out under the so-called hydrothermal synthesis condition. In order to prevent sedimentation of the starting alumina and to increase heat transfer coefficient during the reaction, stirring is sometimes necessary. The stirring, however, has a disadvantage that the resulting fibrous boehmite particles are tied into bundles and the alumina obtained therefrom suffers low quality when used as a carrier. Therefore, the sol-forming reaction should be carried out with stirring accompanied by no shearing or without stirring.

The influence of the stirring is small in the initial stage of the reaction, so that if the stirring is performed until the temperature reaches a given temperature and if the subsequent hydrothermal synthesis is conducted without stirring, bundle-like boehmite is hardly formed. On this account, wet grinding at a low temperature close to 0° C. may be carried out. The wet grinding is generally carried out by introducing a given amount of water, a monobasic acid, a powdery aluminum source, and optionally, a pore structure controlling agent into a 3.6 liter porcelain pot mill containing 5 kg of zirconia balls having a diameter of 10 mmΦ and rotating the mill at 90 rpm for a given period of time at room temperature.

The sol-forming reaction on the low-temperature side needs a long period of time, so that this sol-forming reaction is utilized for the purpose of enhancing the thickening effect due to the initial sol-forming reaction and effectively promoting partial formation of boehmite. This sol-forming reaction is favorable for inhibiting sedimentation of the powdery aluminum source and controlling the physical properties. The sol-forming reaction to completely form boehmite is preferably carried out through hydrothermal synthesis at a high temperature and hydrothermal treatment after the addition of alkali.

As a result, an acid aqueous alumina sol and/or an acid aqueous alumina gel wherein fibrous crystalline boehmite particles are monodispersed is obtained.

When the particle diameter of the aluminum source as a starting material is small, the reaction time becomes long, and the sol-forming reaction proceeds even at normal temperature (0° C.). The reaction time depends upon the type of the aluminum source, particle diameter thereof, acid/alumina ratio, concentration, reaction temperature and the like. As the reaction time is prolonged, the crystallinity of the boehmite becomes higher, and an aqueous alumina sol having higher transparency is obtained. When the reaction time is short or the reaction temperature is low, obtainable is low-crystalline pseudoboehmite. However, if the alkali is added to the boehmite to perform hydrothermal treatment, the crystallinity of the fibrous boehmite is improved and enhanced.

When no pore structure controlling agent is added to the reaction mixture, the product obtained is an aqueous alumina sol having pH of 3 to 4. This aqueous alumina sol has properties that it swells when mixed with water, and can be diluted to any concentration. The aqueous alumina sol is almost free from sedimentation of a precipitate, and a sol having been diluted to have an alumina concentration of 0.1% has light transmittance of 1 to 80% in the wave length of 570 mm. The viscosity of a sol having an alumina concentration of 10% is not less than 10 mPa·s. The boehmite particles in the sol have high monodispersibility, and by an electron microscope, highly crystallized fibrous crystalline boehmite particles having diameters of 3 to 50 nm and lengths of 0.03 to 3 μm are observed. According to X-ray diffractometry, the crystalline boehmite containing water of crystallization is represented by the molecular formula $Al_2O_3·1.05–1.3H_2O$. The fibrous crystalline boehmite loses water of crystallization at 200 to 400° C., and even after losing water of crystallization, the fibrous state of the boehmite is maintained without suffering broken fibers.

Next, monodisperse particles obtained in the present invention and bundle-like particles are described.

The monodisperse boehmite particles obtained in the invention are the particles that take the form of one or two paralleled fibrous particles. Through observation of the monodisperse state by an electron microscope, it is found that even a monodisperse sample occasionally agglomerates on a grid during the preparation of the sample. In this case, also the agglomerated particles, a part of which forms paralleled, are regarded as monodisperse particles as far as their extended parts are each in the form of X or Y. In such monodisperse boehmite particles, the proportion of the number of the fibrous particles which are disposed in one or two rows to the number of primary particles is in the range of 70 to 100%. On the other hand, the bundle-like particles are fibrous particles which are disposed in three to ten-odd rows, and they look like a white suspension in appearance.

When an oxygen-containing organic compound is added as the pore structure controlling agent, a mixture of an aqueous alumina sol and an aqueous alumina gel, which has pH of 3 to 4, is obtained. In the use of an inorganic polybasic acid, most of the product obtained is an aqueous alumina gel.

(4) Neutralization and Hydrothermal Treatment

The acid aqueous alumina sol and/or the acid aqueous alumina gel obtained by the above process may be molded as such to form a catalyst carrier. In this case, however, because of an acid contained therein, dehydration due to drying after the molding process brings about shrinkage, and hence only a molded product having a pore volume of about 0.5 to 0.7 ml/g is obtained. Therefore, the acid aqueous alumina sol and/or the acid aqueous alumina gel is neutralized with an alkali, whereby the pore volume of the resulting alumina composition can be increased.

The alkali is preferably ammonia gas or aqueous ammonia and is added in such an amount that the ratio of ammonia to the whole amount of the acid in the sol and/or the gel becomes not more than 1.5 (ammonia/acid molar ratio). If the amount of the alkali is in this range, control of the pore volume can be made according to the amount added.

After neutralization with an alkali, the sol and/or the gel is subjected to hydrothermal treatment, whereby an alumina composition having a much larger pore volume can be obtained. The temperature of the hydrothermal treatment is desired to be in the range of 0 to 250° C., preferably 70 to 250° C. Through the alkali addition and the hydrothermal treatment, an alumina composition having a pore volume of 0.6 to 1.2 ml/g is obtained.

The unreacted material remaining after the sol-forming reaction is converted into boehmite, and the boehmite becomes an aqueous alumina gel.

It is presumed that, by the hydrothermal treatment, the fibrous boehmite particles are firmly bonded at their knots, and this bonding power resists the shrinkage power due to capillary condensation of water in the dehydration of the drying step, so that a large pore structure can be held.

(5) Drying and Calcining

After the neutralization and the hydrothermal treatment are optionally carried out, the aqueous alumina sol and/or the aqueous alumina gel is dried at a temperature of 50 to 200° C. and then calcined at a temperature of 400 to 700° C. to obtain a γ-alumina composition. Of the aqueous alumina sols and/or the aqueous alumina gels obtainable in the invention, a sol and/or a gel having an alumina concentration of not less than 30% by weight can be molded as such by extrusion molding or the like. Therefore, after molding of the sol and/or the gel into a desired shape, drying and calcining can be carried out.

It is effective to decrease moisture content in air introduced into a calcining furnace because the specific surface area is increased.

The alumina composition obtained by the invention has a specific surface area and a pore volume in extremely wide ranges, and the specific surface area is in the range of 100 to 400 $m^2/g$, the pore volume of pores having pore diameter of less than 60 nm is in the range of 0.5 to 1.2 ml/g, and the mean pore diameter is in the range of 50 to 300 Å.

Molded Product

In the present invention, monolithic molded products and molded products in various forms such as cylindrical, plate and other desired forms can be produced by the use of the aqueous alumina sol and/or the aqueous alumina gel obtained by the above process.

The aqueous alumina sol and/or the aqueous alumina gel obtained by the process of the invention contains fibrous boehmite particles. Hence, properties of the fibers appear strikingly, and the sol and/or the gel has excellent plasticity, moldability and binding powder. The fibrous crystalline boehmite particles can be kept in a fibrous state with a fiber length of 0.05 to 1 μm, even if they are converted into γ-alumina by calcining at a temperature of not lower than 400° C.

Accordingly, the molded product obtained by the use of such fibrous crystalline boehmite particles exhibits very excellent mechanical strength.

An aqueous alumina sol and/or an aqueous alumina gel obtained by the use of a zirconium compound as the inorganic polybasic acid functioning as a pore structure controlling agent contains plate boehmite, and if a molded product obtained therefrom is calcined at a temperature of 500 to 1650° C., a zirconia-alumina molded product having extremely high mechanical strength can be obtained.

Therefore, if a molded product in the form of coating film, sphere, cylinder or tube or a monolithic molded product is produced from a composition obtained by adding more than 0% by weight and not more than 95% by weight (in terms of solids) of a functional compound such as zeolite, copper oxide or barium hydroxide to the zirconium-containing aqueous alumina sol and/or gel, the resulting molded product is useful as a catalyst, an absorbent or a catalyst carrier.

If a composition obtained by blending the fibrous boehmite with organic microcapsules is molded into a film or molded product and then calcined taking advantage of properties that the fibers are hardly broken even after calcining, an extra-light molded product having a porous structure having pore size of submicron to several tens μm and a density of 0.05 to 0.5 g/ml can be obtained. A structure obtained by coating a surface of a cordierite monolithic molded product with the above-mentioned composition containing the organic microcapsules has a function of capturing DPM (diesel particulate material) contained in exhaust gas of diesel car.

Catalyst

The catalyst of the invention using a carrier of the alumina composition is obtained by molding the alumina composition obtained by the above process into a molded product in an appropriate shape and then allowing the molded product to support a catalyst component thereon.

More specifically, the molded product is impregnated with a catalyst component in a conventional method, or the aqueous alumina sol and/or the aqueous alumina gel is mixed with a catalyst component and then subjected to molding, drying and calcining. Thus, a desired catalyst can be obtained. It is also possible to add a catalyst component to the reaction mixture. In the production of, for example, a hydrotreating catalyst for petroleum refining, a compound containing Mo, W or the like as a catalyst component is added to the reaction mixture, from the reaction mixture an aqueous alumina sol and/or the aqueous alumina gel is prepared by the aforesaid method, then the sol and/or the gel is subjected to molding, drying and calcining, and the obtained product is allowed to support a catalyst component such as Ni, Co or the like thereon by an impregnation method. The catalyst obtained by this process has satisfactory activities such as desulfurization activity and nuclear hydrogenation activity. Even if the catalyst components such as Mo, W, Ni and Co are added to the reaction mixture at the same time to prepare a desired catalyst, an inert nickel aluminate or cobalt aluminate compound is not formed.

A compound of Mo, W or the like, e.g., molybdic acid or tungstic acid, is useful as an inorganic polybasic acid serving as the pore structure controlling agent, so that if such a compound is used as the controlling agent, it functions not only as a controlling agent but also as a catalyst component, and this leads to simplification of the process for the catalyst production.

As a specific example of the catalyst, a hydrotreating catalyst having composition of 4.0 wt % NiO.16.5 wt % $MoO_3/Al_2O_3$ or 4.0 wt % CoO.16.5 wt % $MoO_3/Al_2O_3$ and a specific surface area of 200 to 300 $m^2$/g was prepared by impregnating the aforesaid alumina composition with a catalyst component comprising Ni—Mo or Co—Mo in a conventional method. Using the catalyst, hydrotreating reaction of straight-run gas oil was conducted, and as a result, the catalyst exhibited high desulfurization activity. As another example of the catalyst, a hydrotreating catalyst having composition of 4.0 wt % NiO.16.5 wt % $MoO_3/Al_2O_3$ or 4.0 wt % CoO.16.5 wt % $MoO_3/Al_2O_3$ was prepared by mixing the aforesaid aqueous alumina gel obtained after neutralization with an aqueous solution of nickel acetate and ammonium molybdate, or cobalt acetate and ammoniummolybdate as catalyst components and then subjecting the mixture to molding, drying and calcining. This catalyst had a specific surface area of 250 to 450 $m^2$/g, and as a result of desulfurization test of straight-run gas oil, this catalyst exhibited high activity. As a further example of the catalyst, a hydrotreating catalyst having the same composition as described above was prepared by adding compounds of Mo, W, Ni and Co to the reaction mixture containing an oxygen-containing organic compound as the pore structure controlling agent and then performing the same hydrothermal synthesis and the same subsequent operations as described above. This catalyst had a specific surface area of 300 to 400 $m^2$/g, and as a result of desulfurization test of straight-run gas oil, this catalyst exhibited high activity.

Effect of the Invention

By the process for preparing an alumina composition according to the invention, an alumina composition having high specific surface area and large pore volume can be obtained, and this alumina composition is suitable for a catalyst carrier used in the petroleum refining industry.

From the alumina composition, further, a monolithic molded product useful as a catalyst carrier for purification of exhaust gas from a fixed source or a mobile source or an absorbent can be readily produced by molding. Moreover, a porous zirconia/alumina monolithic molded product having high mechanical strength or a molded product having a porous structure having pore size of submicron to several tens $\mu$m, which has been difficult to mold so far, can be produced.

EXAMPLE

The present invention is further described with reference to the following examples, but it should be construed that the invention is in no way limited to those examples.

In the following examples and comparative example, the symbol "%" means "% by weight" unless otherwise noted.

Example 1

To 174 g of an aqueous solution containing 28.4% by weight of $Al(NO_3)_3$, 535 g of gibbsite having a mean particle diameter of 0.5 $\mu$m (C-3005, available from Sumitomo Chemical Co., Ltd., adhesive moisture content: 0.17%, $Al(OH)_3$: 99.5%, impurities such as $Na_2O$: 0.35%) was added, and the mixture was subjected to heat treatment at 250° C. to obtain acid-treated aluminum hydroxide. To 352 g of the acid-treated aluminum hydroxide in terms of $Al_2O_3$ was added 720 ml of ion-exchange water to obtain a reaction mixture having an alumina concentration of 30% by weight.

As a result of calculation based on the starting material used, the reaction mixture had a $HNO_3/Al_2O_3$ molar ratio of 0.20, a $HNO_3/H_2O$ molar ratio of 0.016 and a k value of 0.0032. This reaction mixture was placed in a rotary pressure vessel and subjected to hydrothermal synthesis (sol-forming reaction) at 160° C. for 24 hours with rotating the vessel. Thus, an acid aqueous alumina sol gel was obtained. To the aqueous alumina sol gel, aqueous ammonia of the same moles as that of nitric acid contained in the sol gel was added to neutralize the sol gel and to convert it into an aqueous gel. The aqueous gel was subjected to hydrothermal treatment at 135° C. for 3 hours, then kneaded and extruded through a die of 1.5 mmø to prepare a cylindrical product. The product was dried at 140° C. and then calcined at 560° C. to prepare an alumina molded product.

The alumina molded product had a specific surface area of 171 $m^2$/g and a pore volume of 0.90 ml/g.

Example 2

To 535 g of the same gibbsite as used in Example 1, 106 g of nitric acid having a specific gravity of 1.38 was added, and the mixture was heated at 150° C. in a closed vessel and then heated at 270° C. in an open system.

To the resulting acid-treated aluminum hydroxide, water containing glycolic acid was added. As a result of calculation based on the starting material used, the reaction mixture has an $Al_2O_3$ content of 35% by weight, a glycolic acid/alumina weight ratio of 0.025, a $HNO_3/Al_2O_3$ molar ratio of 0.30, a $HNO_3/H_2O$ molar ratio of 0.032 and a k value of 0.001.

This reaction mixture was placed in a closed vessel, subjected to hydrothermal synthesis (sol-forming reaction) at 170° C. for 6 hours and then further subjected to the subsequent operations under the same conditions as described in Example 1, to prepare an alumina molded product.

The alumina molded product had a specific surface area of 301 $m^2$/g and a pore volume of 0.71 ml/g.

Example 3

To ion-exchange water, 320 g of alumina having a ρ-crystal structure (available from Sumitomo Chemical Co., Ltd., $Al_2O_3$: 93.6% by weight, content of impurity such as $Na_2O$: 0.3% by weight, moisture content: 6.1% by weight) was added together with 62.5 g of aluminum nitrate nonahydrate, followed by wet grinding. Then, 8.8 g of 70 wt % glycolic acid and 85 wt % phosphoric acid were added to prepare a reaction mixture.

The reaction mixture had an alumina concentration of 30% by weight. As a result of calculation based on aluminum nitrate used, the reaction mixture had a $HNO_3/Al_2O_3$ molar ratio of 0.17, a $HNO_3/H_2O$ molar ratio of 0.013, a k value of 0.0022, a glycolic acid/alumina weight ratio of 0.02 and a P/Al atomic ratio of 0.0014.

This reaction mixture was placed in a pressure vessel and subjected to hydrothermal synthesis (sol-forming reaction) first at 100° C. for 48 hours and then at 140° C. for 16 hours in a stationary state to obtain an acid aqueous alumina sol gel. To the acid aqueous alumina sol gel was added aqueous ammonia of such moles as neutralizes 40% of nitric acid contained in the sol gel. The resulting product was subjected to hydrothermal treatment at 135° C. for 3 hours, then kneaded and extruded into a cylindrical product of 1.5 mm. The product was dried at 140° C. and then calcined at 500° C., 550° C. and 600° C. As a result, alumina molded products having specific surface areas of 270 $m^2/g$, 252 $m^2/g$ and 233 $m^2/g$, respectively, were obtained.

Example 4

The same ρ-alumina as used in Example 3 was aged in hot water at 65° C. to obtain aluminum hydroxide which was identified by X-ray diffraction as aluminum hydroxide mainly having a bayerite crystal structure. To the aluminum hydroxide having a bayerite crystal structure, a nitric acid aqueous solution containing oxalic acid di-hydrate was added to prepare a reaction mixture having an $Al_2O_3$ content of 35% by weight, a $HNO_3/Al_2O_3$ molar ratio of 0.20, a $HNO_3/H_2O$ molar ratio of 0.021, a k value of 0.004 and an oxalic acid dihydrate/alumina weight ratio of 0.02. This reaction mixture was subjected to hydrothermal synthesis (sol-forming reaction) at 170° C. for 6 hours in the same manner as in Example 1, to obtain an acid aqueous alumina sol gel comprising fibrous boehmite. To the aqueous alumina sol gel was added aqueous ammonia of the same moles as that of the total of nitric acid and oxalic acid contained in the sol gel. The resulting product was subjected to hydrothermal treatment at 135° C. for 3 hours. Then, an alumina molded product was prepared in the same manner as in Example 1.

The alumina molded product had a specific surface area of 267 $m^2/g$ and a pore volume of 0.75 ml/g.

Example 5

To 375 g of ρ-alumina having a mean particle diameter of 3 μm, 106 g of nitric acid having a specific gravity of 1.38 and 59 g of ion-exchange water were added to prepare a powdery product having an $Al_2O_3$ content of 65% by weight, a $HNO_3/Al_2O_3$ molar ratio of 0.30, a $HNO_3/H_2O$ molar ratio of 0.15 and a k value of 0.045. The powdery product was subjected to hydrothermal synthesis at 180° C. for 6 hours in the same manner as in Example 1 to prepare a powdery reaction product. To the powdery reaction product was added dilute aqueous ammonia to obtain an aqueous alumina gel. The aqueous alumina gel was sufficiently kneaded and extruded. Then, the molded product was subjected to the same treatments as in Example 1 to obtain an alumina molded product.

The alumina molded product had a specific surface area of 308 $m^2/g$.

Examples 6–13, Comparative Examples 1–4

Alumina molded products were prepared using aluminum sources shown in Table 1 and adjusting the alumina concentration and the acid (b)/alumina (a) ratio to those of Example 2, in the same conditions of Example 2. The alumina compositions obtained are set forth in Table 1.

TABLE 1

| | Alminum source | Acid treatment temperature | Oxygen-containing organic compound Type | Weight ratio | Specific surface area $m^2/g$ | Pore volume ml/g |
|---|---|---|---|---|---|---|
| Ex. 6 | bayerite | Untreated | not added | — | 230 | 0.63 |
| Ex. 7 | γ-alumina | Untreated | not added | — | 224 | 0.57 |
| Ex. 8 | γ-alumina | 270° C. | oxalic acid | 0.02 | 244 | 0.56 |
| Ex. 9 | ρ-alumina | Untreated | oxalic acid | 0.02 | 270 | 0.75 |
| Ex. 10 | pseudoboehmite *1 | Untreated | not added | — | 218 | 0.57 |
| Ex. 11 | pseudobehmite | Untreated | oxalic acid | 0.02 | 233 | 0.45 |
| Ex. 12 | Al salt thermal decomposition product *2 | Untreated | not added | — | 223 | 0.60 |
| Ex. 13 | Al salt thermal decomposition product | Untreated | oxalic acid | 0.02 | 249 | 0.64 |
| Comp. Ex. 1 | gibbsite | Untreated | not added | — | non sol gel | |
| Comp. Ex. 2 | rhombic boehmite | 270° C. | not added | — | non sol gel | |
| Comp. Ex. 3 | χ-alumina | 270° C. | not added | — | non sol gel | |
| Comp. Ex. 4 | η-alumina | 270° C. | not added | — | non sol gel | |

*1: Pural SCF-30 available from Condea Co.
*2: 290° C. thermal decomposition product of $Al(NO_3)_3$ As can be seen from the results of Examples 1 to 13, alumina compositions having effective pore structures could be prepared by the use of acid-treated aluminum hydroxide, bayerite, pseudoboehmite, γ-alumina and an Al salt thermal decomposition product as aluminum sources. Especially when an oxygen-containing organic compound was added, the specific surface area was further increased. On the other hand, in Comparative Examples 1 to 4, although alumina compositions were prepared by the use of acid-untreated gibbsite, rhombic boehmite, χ-alumina and η-alumina through the process of the invention, any sol gel was not obtained, and hence an alumina molded product was not prepared.

Example 14

The same ρ-alumina as used in Example 3 was washed with a dilute nitric acid aqueous solution, and thereto were added water, nitric acid and oxalic acid to prepare a liquid having an alumina concentration of 35% by weight, a $HNO_3/Al_2O_3$ molar ratio of 0.20 and an oxalic acid di-hydrate/$Al_2O_3$ molar ratio of 0.02. Then, the liquid was subjected to wet grinding at normal temperature for 20 hours. After the grinding, the resulting product exhibited properties of being thickened at normal temperature, and the sol-forming reaction proceeded. To the product, aqueous ammonia of the same moles as that of the total of nitric acid and oxalic acid contained in the product was added, and at that time, the product changed to a gel. The gel was subjected to hydrothermal treatment at 160° C. for 12 hours. Using the gel, an alumina molded product was prepared in the same manner as in Example 1.

The alumina molded product had a specific surface area of 225 $m^2/g$ and a pore volume of 0.58 ml/g.

Examples 15–19

To 400 g of the same ρ-alumina as used in Example 3, nitric acid aqueous solutions having different concentrations shown in Table 2 were each added. After aging, ion-exchange water was added to prepare reaction mixtures (each: 1,070 g). Each of the reaction mixtures had an alumina concentration of 35% by weight, a $HNO_3/Al_2O_3$ molar ratio of 0.20, a $HNO_3/H_2O$ molar ratio of 0.021 and a k value of 0.0042. The reaction mixtures were subjected to hydrothermal treatment at 135° C. for 28 hours in the same manner as in Example 1 to obtain acid aqueous alumina sol gels. Using the alumina sol gels, alumina molded products were prepared in the same manner as in Example 1, and the specific surface areas of the molded products were measured. The results are set forth in Table 2.

TABLE 2

| Example | Nitric acid concentration (% by weight) | Specific surface area (m²/g) |
|---|---|---|
| Ex. 15 | 7 | 192 |
| Ex. 16 | 12 | 201 |
| Ex. 17 | 20 | 206 |
| Ex. 18 | 30 | 220 |
| Ex. 19 | 61 | 233 |

As can be seen from the results shown in Table 2, by previously treating alumina with a nitric acid aqueous solution of high concentration, alumina having high specific surface area was obtained even at ordinary temperature.

Examples 20–22, Comparative Examples 5–9

To 560 ml of ion-exchange water, acetic acid was added or not added. That is, a water containing no acetic acid (Comparative Example 5), acetic acid aqueous solutions each containing 6.4 g of acetic acid (Comparative Examples 6–9), and acetic acid aqueous solutions containing 19.1 g, 48.7 g and 84.7 g of acetic acid (Examples 20–22), respectively, were prepared in ordinary temperature. To each of them, oxalic acid, glycolic acid and citric acid were added in amounts shown in Table 3, and then 385 g of the same alumina having a ρ-crystal structure as used in Example 3 was further added, to prepare reaction mixtures each having an $Al_2O_3$ content of 36% by weight and a carboxylic acid/alumina weight ratio of 0.02. Then, alumina molded products were prepared in the same manner as in Example 4.

The specific surface areas, pore volumes and compressive strengths of the alumina molded products are set forth in Table 3.

TABLE 3

| Ex. Comp. | Molar ratio, k value | | | Additive | |
|---|---|---|---|---|---|
| Ex. | b/a | b/c | K | Type | Weight ratio |
| Comp. Ex. 5 | — | — | — | glycolic acid | 0.02 |
| Comp. Ex. 6 | 0.03 | 0.003 | 0.00009 | not added | — |
| Comp. Ex. 7 | 0.03 | 0.003 | 0.00009 | glycolic acid | 0.02 |
| Comp. Ex. 8 | 0.03 | 0.003 | 0.00009 | oxalic acid | 0.02 |
| Comp. Ex. 9 | 0.03 | 0.003 | 0.00009 | citric acid | 0.02 |
| Ex. 20 | 0.09 | 0.009 | 0.0008 | glycolic acid | 0.02 |
| Ex. 21 | 0.23 | 0.028 | 0.006 | glycolic acid | 0.02 |
| Ex. 22 | 0.40 | 0.046 | 0.019 | glycolic acid | 0.02 |

TABLE 3-continued

| Ex./Comp. Ex. | Specific surface area m²g | Pore volume ml/g | Compressive strength Kg |
|---|---|---|---|
| Comp. Ex. 5 | 158 | 0.42 | not more than 1.0 |
| Comp. Ex. 6 | 145 | 0.37 | not more than 1.0 |
| Comp. Ex. 7 | 169 | 0.44 | not more than 1.0 |
| Comp. Ex. 8 | 166 | 0.41 | not more than 1.0 |
| Comp. Ex. 9 | 172 | 0.40 | not more than 1.0 |
| Ex. 20 | 198 | 0.54 | 2.3 |
| Ex. 21 | 230 | 0.75 | 2.2 |
| Ex. 22 | 248 | 0.59 | 2.7 |

As can be seen from Table 3, when the k value was small as in Comparative Examples 5 to 9, only an alumina molded product having insufficient specific surface area, pore volume and compression breaking strength was obtained, while the k value of 0.0008 in Example 22 contributed to increase in the specific surface area and the pore volume.

Examples 23–24

A case where glycolic acid was added was compared with a case where glycolic acid was not added. In both cases, the same alumina as in Example 3 was used, the alumina concentration was 2% by weight, and the resulting liquid was subjected to sol-forming reaction, neutralization and hydrothermal treatment in the same manner as in Example 2. Then, alumina molded products were prepared in the same manner as in Example 2.

The preparation conditions and the results are set forth in Table 4.

TABLE 4

| | | | Acid/Alumina | |
|---|---|---|---|---|
| Ex. | Alumina type | $Al_2O_3$ Concentration | type | Molar ratio | K value |
| Ex. 23 | ρ-alumina | 2 | nitric acid | 0.8 | 0.002 |
| Ex. 24 | ρ-alumina | 2 | nitric acid | 0.8 | 0.002 |

| Ex. | Glycolic acid Weight ratio to alumina | Specific surface area (m²/g) | Pore Volume (ml/g) |
|---|---|---|---|
| Ex. 23 | 0.02 | 261 | 0.68 |
| Ex. 24 | not added | 225 | 0.65 |

Examples 25–28, Comparative Examples 10–13

To 560 ml of ion-exchange water, 61 wt % nitric acid was added in amounts of 55 g, 109 g, 219 g and 437 g, respectively, to prepare four kinds of nitric acid aqueous solutions of ordinary temperature. To each of the solutions, oxalic acid, glycolic acid and citric acid were added in amounts shown in Table 5. To each of the mixtures, 385 g of the same alumina having a ρ-crystal structure as used in Example 3 was added, to prepare reaction mixtures each having an $Al_2O_3$ content of 36% by weight and a carboxylic acid/alumina weight ratio of 0.02. The reaction mixtures were subjected to sol-forming reaction at 135° C. for 28 hours in the same manner as in Example 1. Then, alumina molded products were prepared in the same manner as in Example 1.

The specific surface areas, pore volumes and compressive strengths of the alumina molded products are set forth in Table 5.

TABLE 5

| Ex. Comp. Ex. | Molar ratio | | | Additive | |
|---|---|---|---|---|---|
| | K value | | | | Weight |
| | b/a | b/c | K | Type | ratio |
| Ex. 25 | 0.15 | 0.016 | 0.0024 | not added | — |
| Ex. 26 | 0.15 | 0.016 | 0.0024 | glycolic acid | 0.02 |
| Ex. 27 | 0.30 | 0.034 | 0.010 | glycolic acid | 0.02 |
| Ex. 28 | 0.60 | 0.077 | 0.046 | glycolic acid | 0.02 |
| Comp. Ex. 10 | 1.20 | 0.205 | 0.245 | not added | — |
| Comp. Ex. 11 | 1.20 | 0.209 | 0.250 | glycolic acid | 0.02 |
| Comp. Ex. 12 | 1.20 | 0.209 | 0.250 | oxalic acid | 0.02 |
| Comp. Ex. 13 | 1.20 | 0.209 | 0.250 | citric acid | 0.02 |

| Ex. Comp. Ex. | Specific surface area m²/g | Pore volume ml/g | Compressive strength Kg |
|---|---|---|---|
| Ex. 25 | 175 | 0.84 | 2.2 |
| Ex. 26 | 247 | 0.83 | 2.3 |
| Ex. 27 | 238 | 0.65 | 3.5 |
| Ex. 28 | 227 | 0.50 | 3.0 |
| Comp. Ex. 10 | 211 | 0.44 | 1.2 |
| Comp. Ex. 11 | 232 | 0.45 | broken during calcining |
| Comp. Ex. 12 | 232 | 0.46 | broken during calcining |
| Comp. Ex. 13 | 235 | 0.45 | broken during calcining |

As can be seen from the results shown in Table 5, a preferred alumina molded product (carrier) was obtained in Example 28 by virtue of the k value of 0.046.

Figure 2:
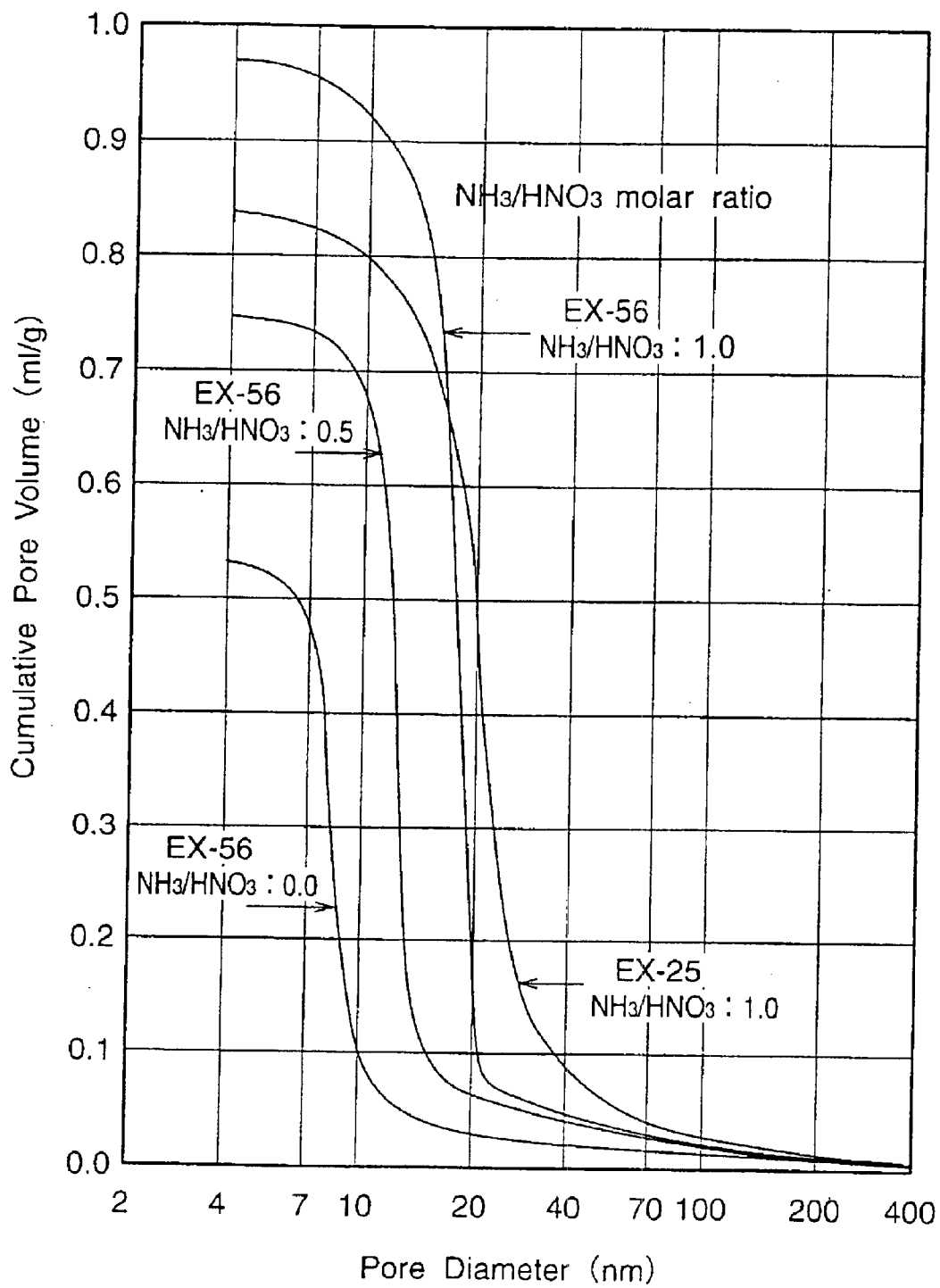
FIG. 2 shows pore size distribution curves of alumina compositions prepared in Examples 25 to 56.

A pore size distribution curve of the alumina composition of Example 25 is shown is FIG. 2.

Examples 29–52, Comparative Examples 14–16.

Alumina molded products were prepared using the same alumina having a ρ-crystal structure as used in Example 3, nitric acid and acetic acid. The amounts of the starting materials, k values, alumina concentrations, types and amounts of the oxygen-containing organic compounds and the inorganic polybasic acids, hydrothermal synthesis (sol-forming reaction) conditions, and hydrothermal treatment conditions after the alkali neutralization are shown in Table 6.

The specific surface areas and the pore volumes of the alumina molded products are set forth in Table 6.

TABLE 6

| Ex. Comp. Ex. | $Al_2O_3$-Monobasic acid | | | |
|---|---|---|---|---|
| | concentration | Type | Molar ratio | K value |
| Ex. 29 | 8 | nitric acid | 0.43 | 0.0029 |
| Ex. 30 | 15 | nitric acid | 0.30 | 0.0029 |
| Comp. Ex. 14 | 15 | nitric acid | 0.30 | 0.0029 |
| Ex. 31 | 52 | nitric acid | 0.115 | 0.0028 |
| Comp. Ex. 15 | 52 | nitric acid | 0.115 | 0.0028 |
| Ex. 32 | 37 | nitric acid | 0.16 | 0.0029 |
| Comp. Ex. 16 | 37 | nitric acid | 0.16 | 0.0029 |
| Ex. 33 | 37 | nitric acid | 0.16 | 0.0029 |
| Ex. 34 | 37 | nitric acid | 0.16 | 0.0029 |
| Ex. 35 | 37 | nitric acid | 0.16 | 0.0029 |
| Ex. 36 | 35 | nitric acid | 0.16 | 0.0026 |
| Ex. 37 | 35 | nitric acid | 0.16 | 0.0026 |
| Ex. 38 | 35 | nitric acid | 0.16 | 0.0026 |
| Ex. 39 | 35 | nitric acid | 0.16 | 0.0026 |
| Ex. 40 | 40 | acetic acid | 0.40 | 0.023 |
| Ex. 41 | 40 | acetic acid | 0.25 | 0.0082 |
| Ex. 42 | 40 | acetic acid | 0.25 | 0.0082 |
| Ex. 43 | 40 | acetic acid | 0.25 | 0.0082 |
| Ex. 44 | 40 | acetic acid | 0.25 | 0.0082 |
| Ex. 45 | 40 | acetic acid | 0.25 | 0.0082 |
| Ex. 46 | 40 | acetic acid | 0.25 | 0.0082 |
| Ex. 47 | 40 | acetic acid | 0.25 | 0.0082 |
| Ex. 48 | 35 | nitric acid | 0.16 | 0.0026 |
| Ex. 49 | 35 | nitric acid | 0.16 | 0.0027 |
| Ex. 50 | 35 | nitric acid | 0.16 | 0.0029 |
| Ex. 51 | 35 | nitric acid | 0.16 | 0.0032 |
| Ex. 52 | 35 | nitric acid | 0.20 | 0.002 |

| Ex. Comp. Ex. | Additive | |
|---|---|---|
| | Type | Weight ratio |
| Ex. 29 | lactic acid | 0.02 |
| Ex. 30 | lactic acid | 0.02 |
| Comp. Ex. 14 | diethylamine | 0.02 |
| Ex. 31 | lactic acid | 0.02 |
| Comp. Ex. 15 | ammonium nitrate | 0.02 |
| Ex. 32 | lactic acid | 0.02 |
| Comp. Ex. 16 | acetamide | 0.02 |
| Ex. 33 | acetone | 0.02 |
| Ex. 34 | butanediol | 0.02 |
| Ex. 35 | lauric acid | 0.02 |
| Ex. 36 | sodium gluconate | 0.02 |
| Ex. 37 | adipic acid | 0.02 |
| Ex. 38 | sucrose | 0.02 |
| Ex. 39 | gelatin | 0.02 |
| Ex. 40 | glycerol | 0.04 |
| Ex. 41 | ammonium tartrate | 0.015 |
| Ex. 42 | citric acid | 0.015 |

| | Type | Atomic Ratio |
|---|---|---|
| Ex. 43 | boric acid | 0.075 |
| Ex. 44 | silicic acid | 0.035 |
| Ex. 45 | phosphoric acid | 0.015 |
| Ex. 46 | sulfuric acid | 0.010 |
| Ex. 47 | titanic acid | 0.025 |
| Ex. 48 | vanadic anhydride | 0.028 |
| Ex. 49 | tungstic acid | 0.016 |
| Ex. 50 | tungstic acid | 0.032 |
| Ex. 51 | tungstic acid oxalic acid(weight raio) | 0.065 0.02 |
| Ex. 52 | carbonic acid | 0.1 |

TABLE 6-continued

| Ex. Comp. Ex. | Hydrothermal synthesis of reaction mixture | | Hydrothermal treatment after neutralization | | Specific surface area | Pore volume |
|---|---|---|---|---|---|---|
| | °C. | hr | °C. | hr | m²/g | ml/g |
| Ex. 29 | 135 | 28 | 135 | 3 | 247 | 0.80 |
| Ex. 30 | 135 | 28 | 135 | 3 | 235 | 0.77 |
| Comp. Ex. 14 | 135 | 28 | 135 | 3 | 180 | 0.82 |
| Ex. 31 | 135 | 28 | 135 | 3 | 225 | 0.71 |
| Comp. Ex. 15 | 135 | 28 | 135 | 3 | 178 | 0.83 |
| Ex. 32 | 135 | 28 | 135 | 3 | 236 | 0.61 |
| Comp. Ex. 16 | 135 | 28 | 135 | 3 | 177 | 0.80 |
| Ex. 33 | 150 | 8 | 135 | 3 | 209 | 0.86 |
| Ex. 34 | 150 | 8 | 135 | 3 | 216 | 0.85 |
| Ex. 35 | 150 | 8 | 135 | 3 | 224 | 0.85 |
| Ex. 36 | 135 | 28 | 135 | 3 | 220 | 1.01 |
| Ex. 37 | 135 | 28 | 135 | 3 | 206 | 0.80 |
| Ex. 38 | 135 | 28 | 135 | 3 | 242 | 0.82 |
| Ex. 39 | 135 | 28 | 135 | 3 | 220 | 0.91 |
| Ex. 40 | 135 | 28 | 125 | 5 | 224 | 0.48 |
| Ex. 41 | 150 | 14 | 110 | 5 | 249 | 0.64 |
| Ex. 42 | 150 | 14 | 110 | 5 | 244 | 0.64 |
| Ex. 43 | 135 | 28 | 135 | 2 | 253 | 1.09 |
| Ex. 44 | 135 | 28 | 135 | 2 | 234 | 0.98 |
| Ex. 45 | 135 | 28 | 135 | 2 | 237 | 0.88 |
| Ex. 46 | 135 | 28 | 135 | 2 | 221 | 0.71 |
| Ex. 47 | 135 | 28 | 135 | 2 | 203 | 0.88 |
| Ex. 48 | 150 | 8 | 135 | 2 | 243 | 0.97 |
| Ex. 49 | 150 | 8 | 135 | 2 | 245 | 0.85 |
| Ex. 50 | 150 | 8 | 135 | 2 | 262 | 0.58 |
| Ex. 51 | 150 | 8 | 135 | 2 | 263 | 0.49 |
| Ex. 52 | 170 | 6 | 135 | 2 | 248 | 0.75 |

Example 53

To 547 ml of ion-exchange water, 61.7 g of acetic acid and 8.4 g of oxalic acid dihydrate were added, and then 160 g of the same alumina having a ρ-crystal structure as used in Example 3 and 231 g of gibbsite described in Example 4 of WO97/32817 were further added to prepare a reaction mixture. This reaction mixture had an alumina concentration of 30% by weight, an acetic acid concentration of 6.2%, an oxalic acid concentration of 0.60%, an acetic acid/alumina molar ratio of 0.35, an acetic acid/water molar ratio of 0.029 and a k value of 0.010.

The reaction mixture was subjected to hydrothermal synthesis (sol-forming reaction) at 150° C. for 24 hours in the same manner as in Example 4. Then, an alumina molded product was prepared in the same manner as in Example 4. The alumina molded product had a specific surface area of 154 m²/g and a pore volume of 0.78 ml/g. This specific surface area was larger by 47 m²/g than the specific surface area 107 m²/g of the alumina containing no oxalic acid, that is described in Example 4 of WO97/32817.

Examples 54–55, Comparative Examples 17–20

Using the same alumina having a ρ-crystal structure as used in Example 3, acetic acid and nitric acid, reaction mixtures having alumina concentrations of 15% by weight and 52% by weight and k values of 0.00008, 0.002 and not less than 0.2 were prepared as shown in table 7. Using the reaction mixtures, alumina molded products were prepared in the same manner under the same conditions as in Example 15. The pore volumes and the compressive strengths of the alumina molded products are set forth in Table 7.

In cases of the alumina concentrations of 15% by weight and 52% by weight, it can be seen that when the k value was 0.00008 or not less than 0.2, the pore volume was small and the compressive strength was low, and when the k value was 0.002, the pore volume and the compressive strength were satisfactory.

TABLE 7

| | AL₂O₃ Concentration (%) | Monobasic acid | Three-component molar ratio, k value | | |
|---|---|---|---|---|---|
| | | | b/a | b/c | k |
| Comp. Ex. 17 | 15 | nitric acid | 0.05 | 0.0016 | 0.00008 |
| Ex. 54 | 15 | nitric acid | 0.25 | 0.008 | 0.002 |
| Comp. Ex. 18 | 15 | acetic acid | 2.30 | 0.094 | 0.22 |
| Comp. Ex. 19 | 52 | nitric acid | 0.02 | 0.004 | 0.00008 |
| Ex. 55 | 52 | nitric acid | 0.10 | 0.020 | 0.002 |
| Comp. Ex. 20 | 52 | acetic acid | 0.75 | 0.275 | 0.21 |

| | Additive | | Pore Volume | Compressive strength |
|---|---|---|---|---|
| | Type | Weight ratio | Ml/g | Kg |
| Comp. Ex. 17 | lactic acid | 0.02 | 0.39 | Not more than 1.0 |
| Ex. 54 | lactic acid | 0.02 | 0.70 | 2.3 |
| Comp. Ex. 18 | lactic acid | 0.02 | 0.43 | Not more than 1.0 |
| Comp. Ex. 19 | lactic acid | 0.02 | 0.37 | Not more than 1.0 |
| Ex. 55 | lactic acid | 0.02 | 0.76 | 2.6 |
| Comp. Ex. 20 | lactic acid | 0.02 | 0.45 | Not more than 1.0 |

Example 56

To a mixture of 755 ml of ion-exchange water, 75 g of 61 wt % nitric acid and 7.4 g of oxalic acid dihydrate, 395 g of ρ-alumina was added to prepare a reaction mixture having an alumina concentration of 30% by weight.

In the same reaction vessel as used in Example 1, the reaction mixture was thickened to not less than 20 mPa at 80° C. with rotating the reaction vessel. Then, the reaction mixture was subjected to hydrothermal synthesis (sol-forming reaction) at 135° C. for 28 hours in a stationary state.

To the resulting product, ammonia for neutralization was added in such an amount that the molar ratio of ammonia to $HNO_3$ would become 0.0 (not added), 0.5 or 1.0. Then, alumina molded products were prepared in the same manner as in Example 1. Pore size distribution curves of the alumina molded products are shown in FIG. 2. As can be seen from the comparison with Example 25 in which oxalic acid was not added but the reaction mixture had similar composition, alumina compositions having sharper pore size distribution curves were obtained.

Example 57

The same reaction mixture as used in Example 56 was subjected to sol-forming reaction at 60° C. for 28 hours in the same manner as in Example 56. To the resulting product, ammonia was added in such an amount that the ammonia/nitric acid molar ratio would become 1.0, and the mixture was subjected to hydrothermal treatment at 170° C. for 6 hours to obtain an alumina composition. Using the alumina composition, an alumina molded product was prepared in the same manner as in Example 1.

The alumina molded product had a specific surface area of 261 m²/g and a pore volume of 0.79 ml/g.

Example 58

A dilute aqueous solution of No. 3 sodium silicate was passed through a cation-exchange resin to obtain a silicic acid aqueous solution containing 3.0% by weight of $SiO_2$.

To 269 ml of ion-exchange water, 290 g of the silicic acid aqueous solution, 54.4 g of acetic acid and 295 g of the same alumina having a ρ-crystal structure as used in Example 3 were added, to prepare a reaction mixture. This reaction mixture had a $Al_2O_3:CH_3COOH:H_2O$ ratio of 36 wt %:5.4 wt %:57.0 wt %, a $SiO_2$ content of 0.86% by weight, an impurity content of 0.12% by weight, a $CH_3COOH/Al_2O_3$ molar ratio of 0.25, a $CH_3COOH/H_2O$ molar ratio of 0.028, a k value of 0.007 and a Si/Al atomic ratio of 0.02.

Thereafter, the reaction mixture was subjected to hydrothermal synthesis at 135° C. for 28 hours in the same manner as in Example 3 without stirring. Using the resulting product, a silica-containing alumina molded product was obtained in the same manner as in Example 3.

The alumina molded product had a specific surface area of 226 $m^2/g$ and a pore volume of 0.98 ml/g.

Example 59

To ion-exchange water, nitric acid and ρ-alumina were added, and then Zicosol ZA-30 (available from Newtex Co., $Zr.O.(CH_3COO)_{1.5}$:48.1%) was further added. The resulting liquid had an $Al_2O_3$ content of 38% by weight, a $HNO_3/Al_2O_3$ molar ratio of 0.165, a $CH_3COOH/Al_2O_3$ molar ratio of 0.11, a Zr/Al atomic ratio of 0.036 and a $ZrO_2$ content of 3.3% by weight.

The reaction mixture was subjected to hydrothermal synthesis at 170° C. for 10 hours in the same manner as in Example 3 to obtain an acid aqueous alumina zirconia sol gel.

The sol gel was subjected to monolithic extrusion molding, then dried and calcined at 500° C. to obtain a monolithic molded product having a pore structure with a specific surface area of 210 $m^2/g$ and a pore volume of 0.46 ml/g, a wall thickness of 0.2 mm, a number of cells of 480/square inch, a numerical aperture of 60% and a lengthwise compressive strength of 35 $kg/cm^2$.

Further, the aqueous alumina zirconia sol gel was mixed with barium hydroxide in an amount of 10% by weight in terms of BaO based on the solid matter (in terms of an oxide) in the sol gel. The mixture was subjected to monolithic extrusion molding, then dried and calcined at 500° C. to obtain a monolithic molded product having a pore structure with a specific surface area of 192 $m^2/g$ and a pore volume of 0.42 ml/g.

Example 60

The aqueous alumina zirconia sol gel prepared in Example 59 was diluted with water to give sol gel having a solid content of 30% by weight. The sol gel was mixed with Matsumoto Microsphere F-30 (vinylidene chloride-acrylonitrile) in such an amount that the solid matter weight ratio would become 1:1. The mixture was placed in a mold, molded under heating, dried, then gradually heated for the prevention of crack, and calcined at 500° C.

The resulting alumina zirconia molded product had the following pore structure. The pore volume of macropores having pore diameter of 1 to 100 μm was 2.4 ml/g, the pore volume of pores having pore diameter of less than 60 nm was 0.45 ml/g, and the specific surface area was 208 $m^2/g$.

Further, the mixture before placing in a mold was diluted with ion-exchange water to give a low-viscosity slurry having a solid content of 5% by weight. Then, a cordierite monolithic molded product (produced by Nippon Gaishi, wall thickness: 0.25 mm, 102mmØ×200 cells) was coated with the slurry by a wash coating method and then calcined to form an uneven coating film of alumina zirconia on the cordierite surface. The thus treated molded product was then mounted on an exhaust vent of a diesel passenger car (Toyota Carina) to capture DPM of the exhaust gas. As a result, this monolithic molded product exhibited higher capture efficiency than a monolithic molded product having no coating film.

Example 61

365 g of the same alumina having a ρ-crystal structure as used in Example 3 were washed with 1380 g of a 0.25% nitric acid aqueous solution to remove a slight amount of a Na component contained in the alumina. The thus washed cake of 630 g was added to a mixture obtained by dissolving 70 g of aluminum nitrate nona-hydrate and 7 g of oxalic acid di-hydrate in 300 ml of ion-exchange water, and thereto was further added 73.4 g of molybdenum oxide to prepare a reaction mixture. The reaction mixture had an alumina concentration (in terms of $Al_2O_3$) of 32.4% by weight, an oxalic acid/alumina weight ratio of 0.014 and a Mo/Al atomic ratio of 0.074.

This reaction mixture was placed in a pressure vessel and subjected to hydrothermal synthesis at 135° C. for 28 hours to obtain an acid aqueous sol gel. To the acid aqueous sol gel, aqueous ammonia was added to neutralize the sol gel. The sol gel was subjected to hydrothermal treatment at 135° C. for 3 hours, then kneaded, extrusion molded, dried and calcined at 450° C. to obtain a Mo-containing alumina molded product. Then, the Mo-containing aluminum molded product was impregnated with a nickel-ammonium complex aqueous solution, then dried and calcined at 550° C. to obtain a catalyst having a composition of (4.0 wt % NiO.16.5 wt % $MoO_3$)/$Al_2O_3$, a specific surface area of 319 $m^2/g$ and a pore volume of 0.51 ml/g.

The catalyst was subjected to sulfiding with hydrogen sulfide at a temperature of 400° C. Then, 1 part by volume of the catalyst, 20 parts by volume of straight-run gas oil containing 1.17% by weight of sulfur and 2400 parts by volume of hydrogen were placed in a batchwise reactor, and hydrotreating reaction was conducted under the conditions of 350° C., 5 MPa and stirring for 1 hour.

As a result of analysis of the reaction product, the catalyst exhibited desulfurization rate of 80.5% of sulfur contained.

Example 62

In 448 ml of ion-exchange water, 70.6 g of aluminum nitrate nona-hydrate, 56.7 g of nickel nitrate hexa-hydrate and 7 g of oxalic acid di-hydrate were dissolved. To the resulting solution, 57.3 g of molybdic acid and 374 g of the same alumina having a ρ-crystal structure as used in Example 3 were added. The resulting mixture had the following composition. The alumina concentration in terms of $Al_2O_3$ was 35.5% by weight, the $HNO_3$ concentration obtained by calculation of only a component converted from nitric acid radical of aluminum nitrate excluding nitric acid radical of nickel nitrate was 3.5% by weight, the content of all $H_2O$ was 51.9% by weight, the content of $Ni(NO_3)_2$ was 3.5% by weight, the impurity content was 0.1% by weight, the $HNO_3/Al_2O_3$ molar ratio was 0.160, the oxalic acid/$H_2O$ molar ratio was 0.0196, the k value was 0031, the oxalic acid/alumina weight ratio was 0.014, and the Mo/Al atomic ratio was 0.050.

Then, operations of hydrothermal synthesis, molding and calcining were conducted in the same manner as in Example 4, and a slight amount of Na contained was removed by washing. The resulting molded product was dried at 140° C.

to obtain a hydrotreating catalyst having a specific surface area of 261 m²/g and a pore volume of 0.62 ml/g.

Then, 20 parts by volume of straight-run gas oil containing 1.17% by weight of sulfur and 2400 parts by volume of hydrogen were placed in a batchwise reactor, and hydrotreating reaction was conducted under the conditions of 350° C., 5 MPa and stirring for 1 hour.

As a result of analysis of the reaction product, the catalyst exhibited desulfurization rate of 74.7% of sulfur contained.

What is claimed is:

1. A process for preparing an alumina composition, consisting essentially of:

adding water and one of a monobasic acid or its salt to at least one aluminum hydroxide and/or alumina selected from the group consisting of substances (A) to (D):

(A) acid-containing aluminum hydroxide obtained by heating aluminum hydroxide in the presence of one of a monobasic acid or its salt;

(B) acid-containing alumina obtained by treating ρ-alumina or γ-alumina in the presence of one of a monobasic acid or its salt;

(C) bayerite; and (D) γ-alumina, to prepare a reaction mixture having a k value adjusted to be in the following range, said k value being represented by the following formula:

$$0.0001 \leq k \leq 0.20$$

$$k=(b/a)\times(b/c)$$

wherein a is a number of moles of alumina in the reaction mixture in terms of $Al_2O_3$, b is a number of moles of the acid or its salt, and c is a number of moles of water, and optionally adding a pore structure controlling agent selected from the group consisting of an oxygen-containing organic compound and inorganic polybasic acid, then subjecting the reaction mixture to sol-forming reaction at a temperature of not higher than 250° C. to obtain one or both of an aqueous alumina sol and an aqueous alumina gel, optionally subjecting one or both of the aqueous alumina sol and the aqueous alumina gel to neutralization with an alkali and hydrothermal treatment at a temperature of not higher than 250° C.; and subjecting one or both of the aqueous alumina sol and the aqueous alumina gel to molding, then drying and calcining.

2. A process for preparing an alumina composition, comprising:

adding water and one of a monobasic acid or its salt and a pore structure controlling agent selected from the group consisting of an oxygen-containing organic compound and an inorganic polybasic acid to alumina having a ρ-crystal structure to prepare a reaction mixture having a k value adjusted to be in the following range, said k value being represented by the following formula:

$$0.0001 \leq K \leq 0.20$$

$$k=(b/a)\times(b/c)$$

wherein a is a number of moles of alumina in the reaction mixture in terms of $Al_2O_3$, b is a number of moles of acid or its salt, and c is a number of moles of water, then subjecting the reaction mixture to -forming reaction at a temperature of not higher than 250° C. to obtain one or both of an aqueous alumina sol and an aqueous alumina gel, optionally subjecting one or both of the aqueous alumina sol and the aqueous alumina gel to neutralization with an alkali and hydrothermal treatment at a temperature of not higher than 250° C.; and subjecting one or both of the aqueous alumina sol and the aqueous alumina gel to molding, then drying and calcining.

3. A process for preparing an alumina composition, comprising:

adding water, one of a monobasic acid or its salt and a pore structure controlling agent selected from the group consisting of an oxygen-containing organic compound and inorganic polybasic acid to at least one aluminum source selected from the group consisting of pseudo-boehmite and a thermal decomposition product of an aluminum salt to prepare a reaction mixture having a k value adjusted to be in the following range, said k value being represented by the following formula:

$$0.0001 \leq k \leq 0.20$$

$$k=(b/a)\times(b/c)$$

wherein a is a number of moles of alumina in the reaction mixture in terms of $Al_2O_3$, b is a number of moles of acid or its salt, and c is a number of moles of water, then subjecting the reaction mixture to sol-forming reaction at a temperature of not higher than 250° C. to obtain one or both of an aqueous alumina sol and an aqueous alumina gel, optionally subjecting one or both of the aqueous alumina sol and the aqueous alumina gel to neutralization with an alkali and hydrothermal treatment at a temperature of not higher than 250° C.; and subjecting one or both of the aqueous alumina sol and the aqueous alumina gel to molding, then drying and calcining.

* * * * *

UNITED STATES PATENT AND TRADEMARK OFFICE
CERTIFICATE OF CORRECTION

PATENT NO.    : 6,884,406 B2                                              Page 1 of 1
DATED         : April 26, 2005
INVENTOR(S)   : Sato et al.

It is certified that error appears in the above-identified patent and that said Letters Patent is hereby corrected as shown below:

Title page,
Item [30], Foreign Application Priority Data, "pct/jp00/00620" should read -- PCT/JP00/00620 --.
Item [22], PCT Filed:, "May 2, 2001" should read -- February 5, 2001 --.

Column 11,
Line 47, delete the title "Effect of the Invention".

Column 14,
Table 1, line 1, second column, "Alminum source" should read -- Aluminum source --.
Table 1, line 6, second column, "pseudobehmite" should read -- pseudoboehmite --.

Column 24,
Line 13, "to -forming" should read -- to sol-forming --.

Signed and Sealed this

Twentieth Day of September, 2005

JON W. DUDAS
*Director of the United States Patent and Trademark Office*